March 18, 1969

H. CHELNER 3,434,090

COMPOUND STRAIN GAGE STRUCTURE

Filed March 1, 1967

INVENTOR.
HERBERT CHELNER

BY *Harry R. Lubcke*

AGENT

United States Patent Office 3,434,090
Patented Mar. 18, 1969

3,434,090
COMPOUND STRAIN GAGE STRUCTURE
Herbert Chelner, Reseda, Calif., assignor, by mesne assignments, to Whittaker Corporation, Los Angeles, Calif., a corporation of California
Filed Mar. 1, 1967, Ser. No. 619,619
U.S. Cl. 338—4          10 Claims
Int. Cl. G01l 1/22

ABSTRACT OF THE DISCLOSURE

A strain gage transducer having an integral diaphragm-side wall structure has a thicker peripheral ridge portion than the thickness of the diaphragm as a whole. Plural centrally located first strain gage elements are each attached throughout their length to the diaphragm and terminate mechanically at its neutral strain axis. Plural peripherally located strain gage elements of typically U shape are similarly attached to the diaphragm and each terminates mechanically at the neutral axis and at the peripheral ridge, respectively. The center gage elements are activated in tension, the peripheral gage elements in compression, and all are symmetrically interconnected electrically. The structure results in minimum slip between elements and diaphragm, thus reducing "creep" and hysteresis. Also, non-linear magnitude of deflection of the diaphragm induced by the peripheral ridge compensates for non-linear performance of the electrical bridge measuring circuit.

Background of the invention

This invention pertains to a strain gage transducer having a diaphragm and plural strain gage elements attached to the diaphragm, to thereby give a change in an electrical characteristic, such as resistance, upon the deflection of the diaphragm in accordance with a change in a physical phenomenon, such as pressure.

The prior art has employed a diaphragm and one or more strain gage elements coactive therewith, but has not comprehended how to achieve great improvements in important characteristics of the whole device. Since the structure and configuration of this invention has not been known, the prior art has been characterized by relatively low output, large size, bothersome slip of the gage elements upon the diaphragm causing "creep" and reduced output, non-linearity of the whole system and a low value of maximum frequency response.

Summary of the invention

The diaphragm and the body of the strain gage transducer are formed of a single piece of metal. Importantly, a peripheral ridge is formed on one side of the diaphragm at its junction with the normally hollow cylindrical body. This provides a high compressive strain where it can be utilized and low compressive strain where the ends of the compressive gage elements must be terminated mechanically on the diaphragm. This provides high output and low creep. Creep is a change of electrical output after a constant value of strain has been imposed upon the diaphragm and it is caused by resilient failure of the bond between a strain gage element and the diaphragm at the ends of the element.

Other extremities of the strain gage elements are terminated mechanically upon the neutral axis of the diaphragm, thereby experiencing negligible strain because of the transition through zero strain from compressive to tensile stress at this axis. With a pair of relatively long and linear gage elements lying across the center of the diaphragm and terminating on the neutral axis, a very high tensile strain with minimum slip is utilized for electrical output. With a pair of relatively long gage elements convoluted into a U or an M shape and disposed between the neutral axis and the peripheral ridge a very high compressive strain with minimum slip is utilized for electrical output. These outputs are essentially balanced in magnitude, thus the regulation requirements of the power supply for the Wheatstone bridge are minimized.

Because low slip is attained the transducer can be made smaller than those of the prior art, say from ¼" down to 0.050" in diameter, thereby increasing the maximum frequency response to the order of 500,000 Hertz (cycles per second).

The peripheral ridge causes the neutral axis to change position radially ot a certain extent with the magnitude of the deflection of the diaphragm. Thus, the composite response of the tensile and compressive gage elements is non-linear in the proper direction to compensate for non-linearity of the known Wheatstone bridge when the changes in resistance of the gage elements is considerable, as is the situation with this transducer. Similarly, non-linearity of semiconductor gage elements may also be compensated for. An improvement in overall linearity of the transducer system is thereby accomplished over that of prior art devices.

Description of preferred embodiments

Figure 1:
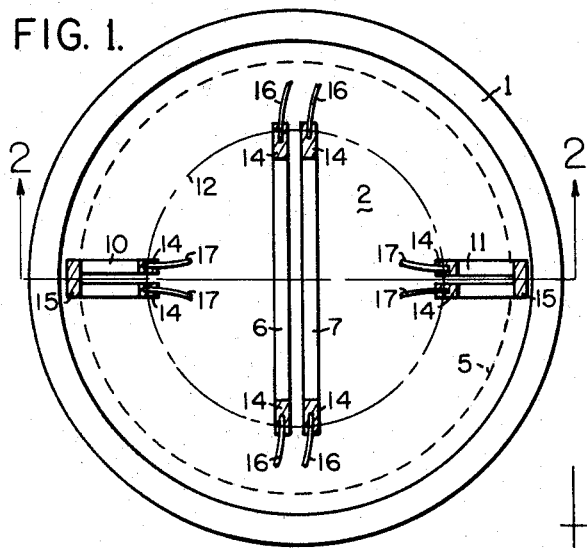
FIG. 1 shows a plan view of the mechano-electric transducer of this invention.

In FIG. 1 numeral 1 indicates the side wall of the transducer. This typically takes the form of a hollow cylinder of 17–4 PH stainless steel. Integral therewith is diaphragm 2, which closes one end of the cylinder. Both cylinder and diaphragm are formed of one piece of material, as by turning in a lathe. After the internal wall is formed, a temporary insert (not shown) in the cavity provides backing so that the relatively thin diaphragm can be turned in the lathe.

The transducer may be constructed in any size and obtain the benefits of this invention; however, modern technology favors a small size and a particular advantage of relatively high output for small size is obtained with a transducer according to this invention. For example, the outside diameter of the side wall cylinder 1 may lie in the range of from ¼" down to 0.050" and still an output obtained that exceeds that of larger prior art transducers.

Diaphragm 2 is typically turned to be planar and of uniform thickness. The thickness chosen depends upon the magnitude of the pressure or equivalent parameter to be measured and may lie within the range of 0.003" to 0.040". Pressure is normally exerted in the direction of arrow 3.

A peripheral ridge 4 is turned upon the outside edge of diaphragm 2. This ridge extends inwardly about ⅟₁₀ of the radius of the diaphragm and characteristically has a slightly slanted inner lip 5 and a fillet in joining the material of the diaphragm to prevent fatigue of the metal. This ridge has a significant influence on the characteristics of the transducer, which significance will be detailed later.

The strain of the above described mechanical structure is sensed electrically by plural strain gage elements. In order to sense the deflection of the central portion of the diaphragm, elongated gage elements 6 and 7 lie substantially adjacent and parallel across the center of the diaphragm. These elements experience a relatively large change in resistance upon being subjected to the maximum value of tension as the diaphragm deflects. Known semiconductor strain gage elements are preferred because of their relatively high output; however, elements 6 and 7 may be of other types, such as deposited films of metal or thin wires.

These elements are firmly attached to diaphragm 2 throughout their length by suitable adhesive areas 8 and 9 applied to the under side thereof. See FIG. 2. The adhesive is typically an epoxy cement for a usual temperature range of from minus 420° Fahrenheit to plus 400° F. A suitable material is Epoxylite, type 6203. This is a two part epoxy consisting of a liquid and a solid. It is of the "filled" type and has a high resistance to damage from chemicals. For high temperatures, such as from minus 50° F. to 1,300° F., a ceramic adhesive is employed, which is baked on.

In a similar manner, plural second transducer elements 10 and 11 are attached to diaphragm 2 at different peripheral positions than those of first transducer elements 6 and 7, as at right angles thereto. Elements 10 and 11 are attached so as to be mechanically terminated at the neutral strain axis 12. This is the same axis at which elements 6 and 7 are mechanically terminated. As will be seen from the graphs of both FIGS. 3 and 4, upon stress being put upon the diaphragm the central area thereof is in tension and the peripheral area is in compression. The neutral axis is circular for a circular diaphragm and lies at approximately ⅔ radius from the center. It is the location where the stress changes from tension to compression.

The opposite ends of elements 10 and 11 mechanically terminate over peripheral ridge 4; that is, within the radial extent of that ridge, wherein the strain due to diaphragm deflection is small. Elements 10 and 11 are shown in U shape in FIG. 1. This effectively increases the full active length of these elements so that the output therefrom due to compression approximately balances that from the physically longer elements 6 and 7 in tension. The change in the magnitude of strain at the peripheral ridge is rapid, as a function of increasing radius from the center of the diaphragm, as will be noted in FIG. 4.

The extremities of all transducer elements are given a treatment, such as gold plating, in order that external leads can be attached. In FIG. 1 this plating has been indicated by hatching 14, as the only drafting nomenclature available, and by the same numeral in other figures. On transducer elements 10 and 11 the inactive closed end of the U is also gold plated at 15, to eliminate any response to tangential strain and to minimize slip according to this invention.

Known leads 16 and 17, of gold, gold plated silver, or platinum wire a few thousandths of an inch in diameter are attached by welding, fusion bonding, or soldering to the first and second types of transducer elements, respectively. Adhesive 18 attaches elements 10 and 11 to the diaphragm in the same manner as adhesive at 8 and 9 was previously employed for elements 6 and 7.

The best known adhesive has always been used in this art, but as previously used the stress and strain demands have exceeded what can be attained by any known material. In this invention it is the physical structure that prevents such inescapable limitations of the adhesive from affecting the functioning of the transducer.

Figure 3:
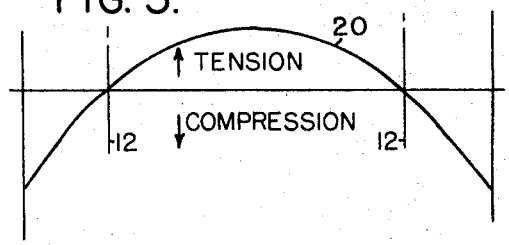
FIG. 3 is a graph of the distribution of stress over a diaphragm of the prior art.

The shear stress in a typical adhesive, such as an epoxy, under a bonded strained gage would theoretically go to infinity. The shear strength of an epoxy is finite, and of the order of 10,000 pounds per square inch. Thus, the stress effectively used is limited to this value and the transducer element actually slips at its ends with respect to the diaphragm. The stress curve of FIG. 3 is for a typical prior art construction, in which the diaphragm (as 2) has a uniform thickness over its entire area and it is merely attached in some manner to a surrounding body (as side wall 1).

Figure 4:
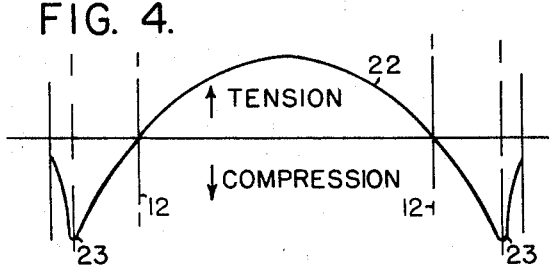
FIG. 4 is a graph of the distribution of stress over the diaphragm and peripheral ridge according to this invention.

FIG. 4 gives the distribution of stress over diaphragm 2, having peripheral ridge 4 and integral side wall 1. It has been drawn to the same scale and is in vertical alignment with FIGS. 1 and 2 to show the relation between structure and stress according to the invention. It will immediately be noted that the compressive stress of curve 22 reaches a finite limit at 23, which is at inner lip 5 and that it then decreases to a small value at side wall 1. This prevents slip of transducer elements 10 and 11 at the outer extremity of each, thus eliminating for all practical purposes loss of output and creep from the electrical output characteristic of the mechano-electric transducer. All of the other mechanical terminations of transducer elements are upon neutral axis 12, which is a region of zero stress and strain. It is also found that the finite stress that can be utilized because of the extension of the inactive length of the gage element beyond boundary 5 of peripheral ridge 4, from neutral axis 12 along curve 22 to point 23 in FIG. 4 is greater in amplitude than the corresponding stress from neutral axis 12 along curve 20 in FIG. 3 to the point where the shear strength of the adhesive reaches its limit and the transducer element from there on ceases to convert mechanical strain to electrical output. Accordingly, greater compressive strain output is obtained from the structure of the invention than has heretofore been possible without slip.

Figure 5:
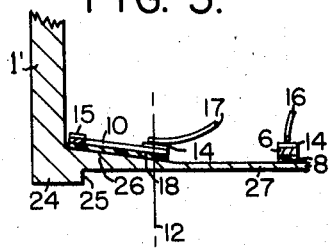
FIG. 5 shows a fragmentary sectional elevation according to FIG. 2 of a first alternate embodiment of the invention.

The alternate embodiment shown in FIG. 5 is characterized by a thicker peripheral area 26 extending all around diaphragm 27. The integral structure with side wall 1' is the same as in FIG. 2, as is the peripheral ridge 4. However, in FIG. 5 inner lip 25 is shown as vertically upwards. This abrupt ridge configuration may be employed with safety in this alternate construction as a matter of long life better than it can be employed in the basic construction of FIG. 2.

Figure 2:
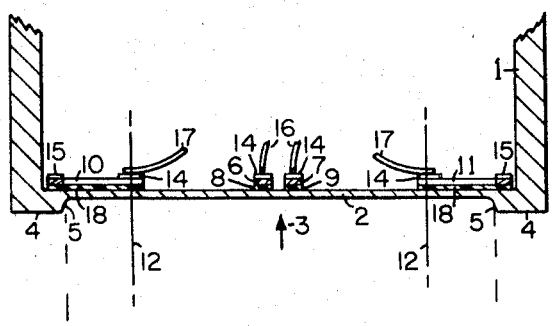
FIG. 2 shows a sectional elevation of the same along a diameter, as shown at 2—2 in FIG. 1.

The central tension transducer elements, of which 6 is illustrative in fragmentary FIG. 5, along with its adhesive 8, plating 14 and lead 16, are all the same as these are in FIG. 2. The peripheral compression transducer elements, of which 10 is illustrative, along with adhesive 18, plating 14 and lead 17, are the same as in FIG. 2, save that they are mounted on inclined part of thicker peripheral area 26 rather than on flat diaphragm 2. Area 26 is "flat" with respect to element 10; thus, the element is mounted flat without bending, which is not possible with certain semiconductor transducer elements because of brittleness. To be "flat" area 26 need only have a uniform increase in thickness with increase in radius from the radius at which the incline starts, typically at the neutral axis.

For a typical thickness of 0.010" for diaphragm 27, the additional thickness at the maximum radius may be another 0.010", or a total thickness at maximum radius of 0.020". This increased thickness enhances the non-slip characteristic for the adhesion of transducer element 10 at the maximum radius of the diaphragm and also causes an increased variation of the position of the neutral axis with deflection of the diaphragm, thus to increase non-linearity of transducer response and so to further compensate for non-linearity of the bridge circuit in particular embodiments. With due attention to this compensation in relation to other parameters, including transducer element sensitivity, the overall linearity can be increased to over 99%.

Figure 6:
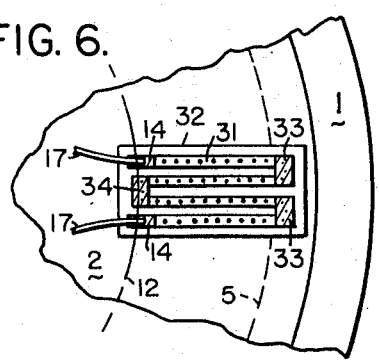
FIG. 6 shows a fragmentary plan view of the mechano-electric transducer on a large scale with an alternate type of compression transducer element.

A further alternate embodiment with respect to the type of compression transducer element, 31, is shown in FIG. 6. This element has an M shape to the active material. It may be of diffused construction, in which a single wafer 32 of a semiconductor, such as silicon, is infused with a given impurity to form a P type element of M shape within an N type wafer. The active P element is depicted with dots in FIG. 6. The ends 33 thereof, which are not to play an active part in the strain pattern, are gold plated so as to be inactive as a transducer. This is the same as the treatment of ends 15 of elements 10 and 11 in FIG. 1. Plating at the central end 34 of the M is also employed in FIG. 6. Plating 14 and connections 17 are as in FIG. 1.

The more traverses there are of sensitive transducer material within the compression zone the greater will be the electrical output, all other factors being constant. Thus, the balance between the electrical outputs of tensile and compressive elements can be made equal to suit variations in other parameters that are involved.

The upper part of side wall 1 of each embodiment may be provided with a flange (not shown) and/or other details for fastening the mechano-electric transducer of this invention into a device in which the pressure or other parameter is to be measured.

The peripheral ridge 4 and the arrangement of transducer elements with respect to the neutral axis 12 of the diaphragm according to this invention gives improved performance when employed for a flow meter type of transducer, in which the deflection of the diaphragm may not be symmetrical.

The mechano-electric transducer of this invention is normally used with a Wheatstone bridge in which centrally located transducer elements 6 and 7 form opposite arms of the bridge. Leads 16 thereof connect to the required external circuit of the bridge. Similarly, peripheral compression transducer elements 10 and 11 form the other two opposite arms and leads 17 connect to the bridge.

Either a constant voltage or a constant current type power supply may be used. This is connected across the first diagonal of the bridge. If the former, a D.C. voltage in the range of 10 to 30 volts is typical. Temperature compensating resistors may be inserted in the connection from the power supply to across the first diagonal of the bridge, also a balance and temperature compensating resistor may be connected across one of the peripheral compression transducers.

The output indicator may be an oscilloscope, an oscillograph, a magnetic data recorder, a chart recorder, or a galvanometer. The indicator is connected across the second diagonal of the bridge.

The impedance of the individual transducer elements is typically 400 ohms, resistive; thus forming a bridge having this impedance across a diagonal. However, transducer element can be constructed and placed upon the relatively small sized diaphragm 2 which have individual resistances in the range of from 50 to 5,000 ohms. The output indicator should preferably have an input impedance that is high with respect to the impedance of the bridge so that the bridge will not be significantly loaded.

In preferred embodiments heating of individual transducer elements by the current through them is negligible. The current need only be such that the dissipation of each is 0.1 watt or less. With the higher resistance elements the dissipation may be as small as 0.025 watt.

This invention has been described in preferred forms with particularity, but this is only by way of example. Various changes in construction may be made without departing from the spirit and scope of the invention.

I claim:
1. A mechano-electric transducer comprising:
 (a) an integral diaphragm-side wall assembly having a peripheral ridge (4) adjacent to said side wall (1), which ridge is thicker than the remainder of said diaphragm (2), and having a neutral strain axis upon said diaphragm closer to the center thereof than said ridge,
 (b) plural first tranducer elements (6, 7) attached to said diaphragm, said first transducer elements lying substantially adjacent and parallel across the center of said diaphragm, and mechanically terminated at opposite ends upon said neutral axis, and
 (c) plural second transducer elements (10, 11) attached to said diaphragm at different peripheral positions than said first transducer elements, said second transducer elements each mechanically terminated at opposite ends upon said neutral strain axis and over said peripheral ridge, respectively.
2. The transducer of claim 1 in which:
 (a) said peripheral ridge (4) decreases in thickness gradually (5) to that of said diaphragm (2),
  whereby nonlinearity of the mechano-electric characteristic with respect to diaphragm strain occurs in said second transducer elements (10, 11).
3. The transducer of claim 1 in which:
 (a) the diaphragm (27) has a gradual increase in thickness (26) uniformly with increasing radius under all of said plural second transducer elements (10, 11) upon all of the side of the diaphragm opposite said peripheral ridge (24).
4. The transducer of claim 3 in which:
 (a) the decrease in thickness of said peripheral ridge (24) to the thickness of the diaphragm (27) is abrupt.
5. The transducer of claim 3 in which:
 (a) said gradual increase in thickness (26) with increasing radius starts at approximately and within the radius of the neutral axis (12) of the diaphragm (27).
6. The transducer of claim 3 in which:
 (a) said gradual increase in thickness (26) approximately doubles the thickness of the diaphragm (27) at its maximum radius over its thickness at within the radius of the neutral axis (12) thereof.
7. The transducer of claim 1 in which:
 (a) said second transducer elements (10, 11) are formed mechanically with at least one return path in the radial direction, and
 (b) all direct paths and said return path are electrically connected in series in each said transducer element.
8. The transducer of claim 7 in which:
 (a) said direct and return paths have a U shape in the whole, and
 (b) the bottom of the U shape is located at the greatest radius of the diaphragm (2).
9. The transducer of claim 7 in which:
 (a) said direct and return paths (31) have an M shape in the whole, and
 (b) the top (33) of the M shape is located at the greatest radius of the diaphragm (2).
10. The transducer of claim 1 in which:
 (a) each of the second transducer elements (31) is formed of a path of an impurity in a wafer of semiconductor (32).

References Cited
UNITED STATES PATENTS

| | | | |
|---|---|---|---|
| 3,151,306 | 9/1964 | Hines | 338—5 |
| 3,213,400 | 10/1965 | Gieb | 338—5 |
| 3,325,761 | 6/1967 | McLellan | 338—4 |
| 3,335,381 | 8/1967 | Giovanni | 338—4 |
| 3,341,794 | 9/1967 | Stedman | 338—4 |

REUBEN EPSTEIN, *Primary Examiner.*

U.S. Cl. X.R.

73—88.5; 338—2